US009400507B2

(12) United States Patent
Mevius et al.

(10) Patent No.: US 9,400,507 B2
(45) Date of Patent: Jul. 26, 2016

(54) UPSTREAM SENSE FOR BALANCE PORT

(71) Applicant: EMERSON PROCESS MANAGEMENT REGULATOR TECHNOLOGIES, INC., McKinney, TX (US)

(72) Inventors: Jason S. Mevius, McKinney, TX (US); Biao Zhou, Chengdu (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 200 days.

(21) Appl. No.: 13/794,021

(22) Filed: Mar. 11, 2013

(65) Prior Publication Data

US 2014/0090717 A1     Apr. 3, 2014

(30) Foreign Application Priority Data

Sep. 28, 2012   (CN) .......................... 2012 1 0376784

(51) Int. Cl.
| | |
|---|---|
| G05D 11/00 | (2006.01) |
| G05D 16/10 | (2006.01) |
| G05D 16/02 | (2006.01) |
| G05D 16/06 | (2006.01) |

(52) U.S. Cl.
CPC ............... *G05D 16/10* (2013.01); *G05D 16/02* (2013.01); *G05D 16/0694* (2013.01); *Y10T 137/0379* (2015.04); *Y10T 137/261* (2015.04); *Y10T 137/7801* (2015.04)

(58) Field of Classification Search
CPC .............. F16K 39/022; G05D 16/0688; Y10T 137/261; Y10T 137/7801

USPC ........................... 137/116.5, 505.18; 251/282
See application file for complete search history.

(56) References Cited

U.S. PATENT DOCUMENTS

| | | | | | |
|---|---|---|---|---|---|
| 2,235,304 | A | * | 3/1941 | Toussaint | ........................ 251/45 |
| 3,493,007 | A | * | 2/1970 | Iizumi | ........................ 137/116.5 |
| 3,949,964 | A | * | 4/1976 | Freeman | ........................ 251/76 |
| 4,796,854 | A | * | 1/1989 | Ewing | ........................ 251/129.07 |
| 2009/0260697 | A1 | | 10/2009 | Mevius et al. | |
| 2009/0261281 | A1 | | 10/2009 | Mevius et al. | |

FOREIGN PATENT DOCUMENTS

WO    WO-2004/088445 A1    10/2004

OTHER PUBLICATIONS

"Diaghragm". Merriam-Webster. Mar. 2015.*
Search Report for PCT/US2013/062088 mailed Oct. 23, 2014.
Written Opinion for PCT/US2013/062088 mailed Oct. 23, 2014.

* cited by examiner

*Primary Examiner* — R. K. Arundale
(74) *Attorney, Agent, or Firm* — Marshall, Gerstein & Borun LLP

(57) ABSTRACT

A fluid regulating device includes a regulator valve having a valve body defining an inlet and an outlet and a valve port disposed between the inlet and the outlet. A housing assembly is disposed adjacent the valve port, and the housing assembly includes a first aperture adapted to receive a valve disc. A balancing diaphragm is secured to a portion of the valve disc and a portion of the housing assembly, and a portion of a balancing cavity is defined by a top surface of the balancing diaphragm and an interior surface of the housing assembly. A sensing passage extends from the inlet of the regulator valve to the balancing cavity such that the inlet of the regulator valve is in fluid communication with the balancing cavity.

14 Claims, 4 Drawing Sheets

UPSTREAM SENSE FOR BALANCE PORT

FIELD OF THE INVENTION

The present invention relates to fluid flow regulating devices such as gas regulators and, more particularly, to gas regulators having a balanced trim.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a balanced trim to improve the reaction of the gas regulator to variations in the downstream pressure. The balanced trim is adapted to reduce the influence of the upstream pressure on the performance of the gas regulator. The upstream pressure is placed in fluid communication with a balancing diaphragm to apply a force to the control element of the gas regulator in the opposite direction as the force of the downstream pressure. Accordingly, as the upstream pressure varies, a corresponding force is applied to balance the force created by the upstream pressure as described further below so that the gas regulator acts in response to the downstream pressure only.

In conventional regulators having a balanced trim, a portion of the fluid flowing through the gas regulators may travel through channels that are longitudinally disposed within the control element, and the channels open to a balancing cavity that is at least partially defined by the balancing diaphragm. Such a configuration allows for high flow capacity at low inlet pressures. However, as the valve opens, the inlet pressure bearing on the balancing diaphragm does not remain constant. More specifically, the sensing pressure reduces as the valve opens, resulting in "droop" and instability in the gas regulator.

SUMMARY

A fluid regulating device includes a regulator valve having a valve body defining an inlet and an outlet, the regulator valve further including a valve port disposed between the inlet and the outlet. An actuator is coupled to the regulator valve and includes a valve disc, the valve disc disposed within the regulator valve and adapted for displacement along a longitudinal axis between a closed position sealingly engaging the valve port and an open position disposed away from the valve port. A housing assembly is disposed adjacent the valve port, and the annular housing assembly includes a first aperture adapted to receive the valve disc. The fluid regulating device further includes a balancing diaphragm secured to a portion of the valve disc and a portion of the housing assembly. In addition, the fluid regulating device has a balancing cavity and a portion of the balancing cavity is defined by a top surface of the balancing diaphragm and an interior surface of the housing assembly. The fluid regulating device additionally includes a sensing passage extending from the inlet of the regulator valve to the balancing cavity such that the inlet of the regulator valve is in fluid communication with the balancing cavity.

In addition, a method of introducing pressure into a balanced trim assembly of a fluid regulating device includes introducing a portion of a fluid flowing from an inlet of the fluid regulating device to an outlet of the fluid regulating device into a first end of a sensing passage. The first end of the sensing passage is disposed upstream of a valve port that is adapted to be sealingly engaged by a valve disc to close the fluid regulating device. The method further includes disposing a second end of the sensing passage adjacent to or within a balancing cavity partially defined by a portion of the balancing diaphragm such that the inlet of the fluid regulating device is in fluid communication with the balancing cavity.

DETAILED DESCRIPTION

Figure 1:
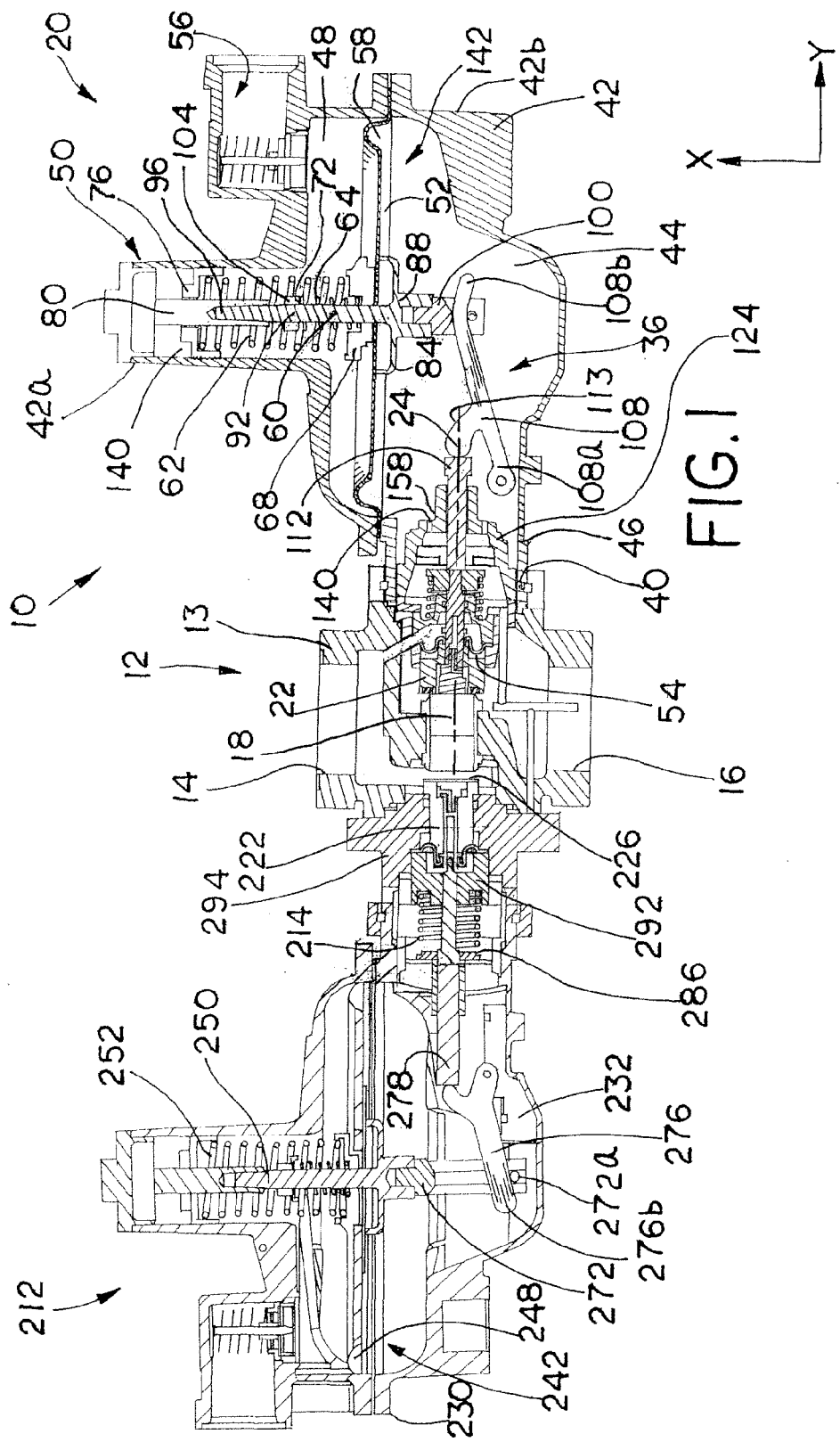
FIG. 1 is a side cross-sectional view of an embodiment of a gas regulator in a fully open position, the gas regulator having an actuator and a regulator valve with a sensing passage.
Figure 2:
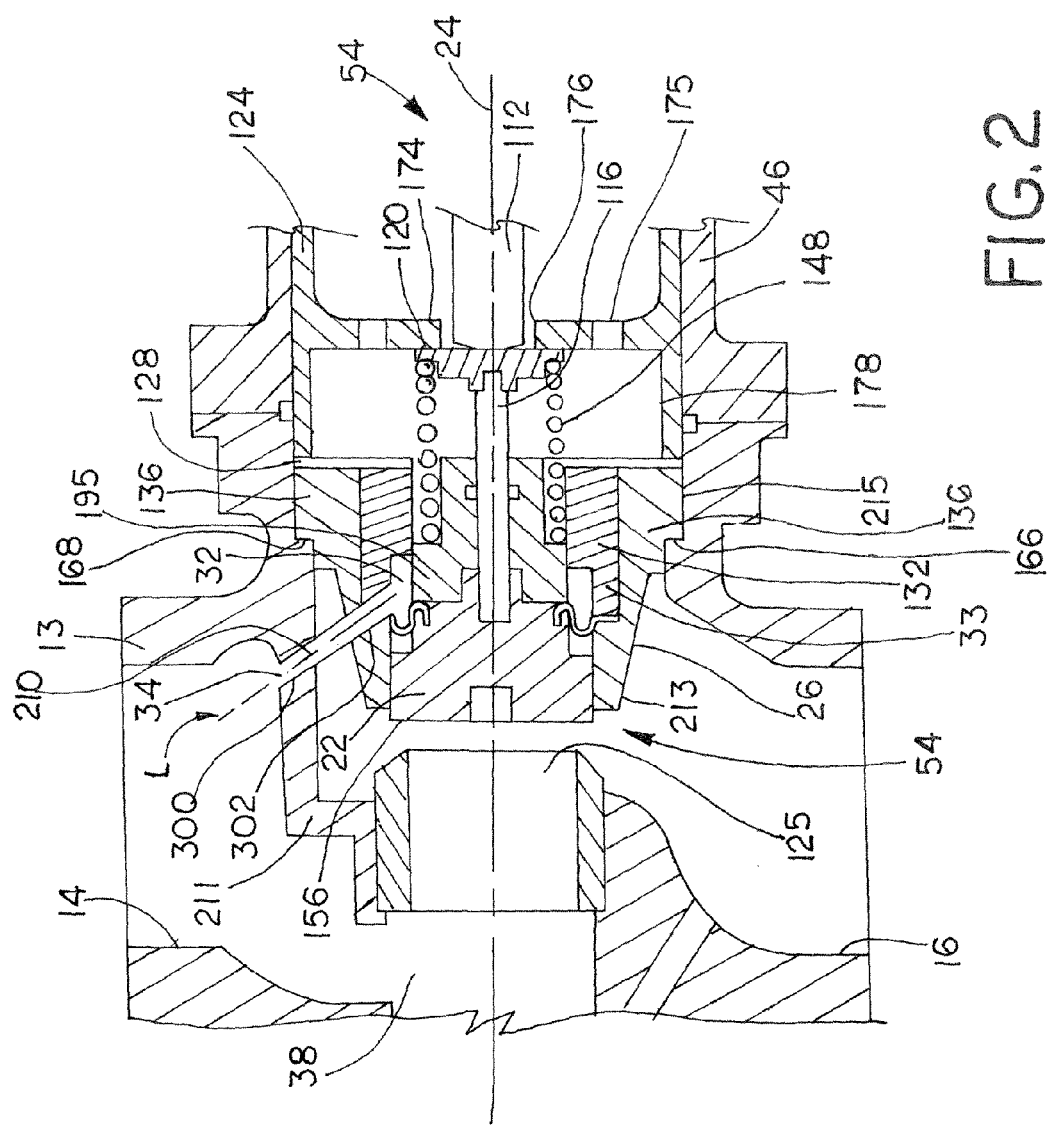
FIG. 2 is a side cross-sectional view of the sensing passage and housing assembly of FIG. 1.
Figure 3:
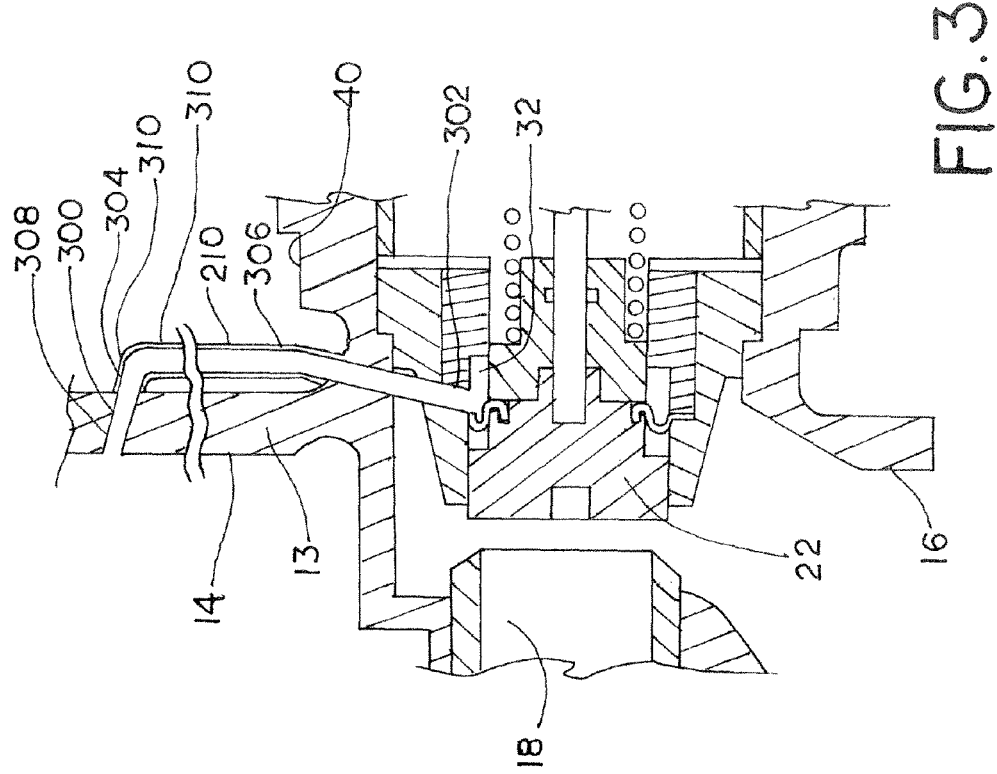
FIG. 3 is a side cross-sectional view of an alternative embodiment of a sensing passage.

FIGS. 1 and 2 illustrate a fluid regulating device 10 including a regulator valve 12 having a valve body 13 defining an inlet 14 and an outlet 16, the regulator valve 12 further including a valve port 18 disposed between the inlet 14 and the outlet 16. An actuator 20 is coupled to the regulator valve 12 and includes a valve disc 22, the valve disc 22 disposed within the regulator valve 12 and adapted for displacement along a longitudinal axis 24 between a closed position sealingly engaging the valve port 18 and an open position disposed away from the valve port 18. As shown in FIG. 3, a housing assembly 26 is disposed adjacent the valve port 18, and the annular housing assembly 26 includes a first aperture 28 adapted to receive at least a portion of the valve disc 22. The fluid regulating device 10 further includes a balancing diaphragm 30 secured to a portion of the valve disc 22 and a portion of the housing assembly 26. In addition, the fluid regulating device 10 has a balancing cavity 32 and a portion of the balancing cavity 32 is defined by a top surface 31 of the balancing diaphragm 30 and an interior surface 33 of the housing assembly 26. The fluid regulating device 10 additionally includes a sensing passage 34 extending from the inlet 14 of the regulator valve 12 to the balancing cavity 32 such that the inlet 14 of the regulator valve 12 is in fluid communication with the balancing cavity 32. So configured, the upstream pressure introduced into to the balancing cavity 32 is independent of the position of the valve disc 22, and the pressure acting on the balancing diaphragm 30 is constant. Accordingly, the stability of the fluid regulating device 10 is improved, thereby allowing for high flow capacity at high inlet pressures.

Turning to the fluid regulating device 10 in more detail, the fluid regulating device 10 includes the actuator 20 and the regulator valve 12, as illustrated in FIGS. 1 and 2. The regulator valve 12 includes a valve body 13 forming the inlet 14 for receiving gas from a gas distribution system, for example, and the outlet 16 for delivering gas to a facility having one or more appliances, for example. The actuator 20 is coupled to the regulator valve 12 and includes a control assembly 36 having a control element, such as a valve disc 22. During a first or normal operational mode, the control assembly 36 senses the pressure at the outlet 16 of the regulator valve 12 (i.e., the outlet pressure) and controls a position of the valve disc 22 such that the outlet pressure approximately equals a predetermined setpoint or control pressure.

With reference to FIGS. 1 and 2, the regulator valve 12 defines a throat 38 and a valve mouth 40. The throat 38 is disposed between the inlet 14 and the outlet 16, and has the valve port 18 disposed therein. Gas must travel through the valve port 18 to travel between the inlet 14 and the outlet 16 of the regulator valve 12. The valve port 18 may be removable from the regulator valve 12 such that it may be replaced with a different valve port having a bore of a different diameter or configuration to tailor operational and flow characteristics of the regulator valve 12 to a specific application. In the disclosed embodiment, the valve mouth 40 defines an opening disposed along an axis that is generally parallel to the horizontal longitudinal axis 24 (i.e., along the X axis of the reference coordinate system provided in FIG. 1) and that is generally perpendicular to a vertical longitudinal axis (i.e., an axis disposed along or parallel to the Y axis of the reference coordinate system provided in FIG. 1) of the inlet 14 and outlet 16 of the regulator valve 12.

Referring to FIG. 1, the actuator 20 includes a housing 42 and the control assembly 36, as discussed above. The housing 42 includes an upper housing component 42a and a lower housing component 42b secured together with a plurality of fasteners, for example. The lower housing component 42b defines a control cavity 44 and an actuator mouth 46. The actuator mouth 46 is connected to the valve mouth 40 of the regulator valve 12 to provide fluid communication between the actuator 20 and the regulator valve 12. The upper housing component 42a defines a relief cavity 48 and a tower portion 50 for accommodating a portion of the control assembly 36, as will be described.

The control assembly 36 includes a diaphragm subassembly 52, a disc and balancing subassembly 54, and a release valve 56. The diaphragm subassembly 52 includes a diaphragm 58, a piston 60, a control spring 62, a relief spring 64, a combination spring seat 68, a relief spring seat 72, a control spring seat 76, and a piston guide 80.

More particularly, the diaphragm 58 includes a disc-shaped diaphragm defining an opening through a central portion thereof. The diaphragm 58 is constructed of a flexible, substantially air-tight, material and its periphery is sealingly secured between the upper and lower housing components 42a, 42b of the housing 42. The diaphragm 58 therefore separates the relief cavity 48 from the control cavity 44.

The combination spring seat 68 is disposed on top of the diaphragm 58 and defines an opening disposed concentric with the opening in the diaphragm 58. As depicted in FIG. 1, the combination spring seat 68 supports the control spring 62 and the relief spring 64.

The piston 60 of the disclosed embodiment includes a generally elongated rod-shaped member having a sealing cup portion 84, a yoke 88, a threaded portion 92, and a guide portion 96. The sealing cup portion 84 may have a generally concave disc-shape and may extend circumferentially about a mid-portion of the piston 60, and may be located just below the diaphragm 58. The yoke 88 includes a cavity adapted to accommodate a coupler 100 that connects to a portion of the disc and balancing subassembly 54 to enable attachment between the diaphragm subassembly 52 and the disc and balancing subassembly 54, as will be described.

The guide portion 96 and the threaded portion 92 of the piston 60 are disposed through the openings in the diaphragm 58 and the combination spring seat 68, respectively. The guide portion 96 of the piston 60 is slidably disposed in a cavity in the piston guide 80, which maintains the axial alignment of the piston 60 relative to the remainder of the control assembly 36. The relief spring 64, the relief spring seat 72, and a nut 104 are disposed on the threaded portion 92 of the piston 60. The nut 104 retains the relief spring 64 between the combination spring seat 68 and the relief spring seat 72. The control spring 62 is disposed on top of the combination spring seat 68, as mentioned, and within the tower portion 50 of the upper housing component 42a. The control spring seat 76 is threaded into the tower portion 50 and compresses the control spring 62 against the combination spring seat 68. In the disclosed embodiment, the control spring 62 and the relief spring 64 include compression coil springs. Accordingly, the control spring 62 is grounded against the upper housing component 42a and applies a downward force to the combination spring seat 68 and the diaphragm 58. The relief spring 64 is grounded against the combination spring seat 68 and applies an upward force to the relief spring seat 72, which in turn is applied to the piston 60. In the disclosed embodiment, the force generated by the control spring 62 is adjustable by adjusting the position of the control spring seat 74 in the tower portion 50, and therefore the control pressure of the regulator 10 is also adjustable.

The control spring 62 acts against the pressure in the control cavity 44, which is sensed by the diaphragm 58. As stated, this pressure is the same pressure as that which exists at the outlet 16 of the regulator valve 12. Accordingly, the force applied by the control spring 62 sets the outlet pressure to a desired setpoint or control pressure for the regulator 10. The diaphragm subassembly 52 is operably coupled to the valve disc 22 and balancing subassembly 54, as mentioned above, via the yoke 88 of the piston 60 and the coupler 100, and by a control arm 108.

The disc and balancing subassembly 54 includes an actuator stem 112 that is engaged by the control arm 108 to move the valve disc 22 between the open and closed positions as the diaphragm 58 flexes due to variations in the downstream pressure. Specifically, the actuator stem 112 is a generally linear rod having an end surface engaged by the control arm 108. The control arm 108 is a slightly curved rod and includes a fulcrum end 108a and a free end 108b. The fulcrum end 108a is pivotally coupled to the lower housing component 130b and includes a finger 113 having a rounded end and engaging the end surface of the actuator stem 112. The free end 108b is received between a top portion and a pin of the coupler 100 that is attached to the yoke 88 of the piston 60. Thus, the coupler 100 and the control arm 108 operably connect the disc and balancing subassembly 54 to the diaphragm subassembly 52.

As illustrated in FIG. 2, the valve disc 22 of the disc and balancing subassembly 54 is operatively connected to the actuator stem 112, and includes a sealing surface 156 that is adapted to engage the outlet of the valve port 18 to cut off the fluid flow through the regulator valve 12 when the regulator valve is in the closed position. The valve disc 22 may be directly or indirectly coupled to the actuator stem 112 by a balanced port stem 116 and a balancing spring seat 120, and the combined elements are supported for linear movement by a stem guide 124, a retainer plate 128, a balancing diaphragm retainer 132, a balancing port housing 136, and a guide insert 195. The stem guide 124 is configured to fit within the actuator mouth 46, and the stem guide 124 may be secured to the actuator mouth 46 by any means known in the art, such as threading. Alternatively, the stem guide 126 may not be secured to the actuator mouth 46. The stem guide 126 may include a radial wall 174 having a plurality of apertures 175 disposed therethrough to form a portion of the path placing the outlet 16 in fluid communication with the control cavity 44 as discussed further below. The stem guide 126 may also include a central aperture 176 that receives the actuator stem 112. The actuator stem 112 is also slidably received in a cylindrical portion 158 of the stem guide 124 to provide lateral support to the actuator stem 112, as illustrated in FIG. 1. The stem guide 124 further includes a plurality of channels 140 disposed adjacent to the cylindrical portion 158 forming a portion of the path placing the outlet 16 in fluid communication with the control cavity 44 as discussed further below.

As illustrated in FIG. 2, a portion of the stem guide 124, such as a bottom portion of a cylindrical wall 178 of the stem guide 124 may engage the housing assembly 26 to secure the housing assembly in within the mouth 40 of the regulator valve 12. More specifically, referring to FIG. 4, the housing assembly 26 may include a retainer plate 128, the diaphragm retainer 132, and the balancing port housing 136, and the bottom portion of the cylindrical wall 178 of the stem guide 124 may engage the retainer plate 128, which is disposed between the stem guide 124 and the balanced port housing 136, to hold the retainer plate 128 and balanced port housing 136 in place within the valve mouth 40. The retainer plate 128 may have the shape of a flat disc and may include a central opening 180 through which the balanced port stem 116 passes. The balanced port housing 136 may be generally cylindrical and hollow and may extend toward the valve port 18 along the longitudinal axis 25 such that a first end 170 is disposed adjacent the valve port 18 and a second end 172 is disposed adjacent the retainer plate 128. The balanced port housing 136 may include the first aperture 28 that extends from the first end 170 of the balanced port housing 136 towards the second end 172 along the longitudinal axis 24. The first aperture 28 may extend to a vertically disposed end surface 164 of the balanced port housing 136 disposed between the first end 170 and the second end 172 of the balanced port housing 136. The first aperture 28 may be sized and shaped to slidably receive at least a portion of the valve disc 22 when the valve disc 22 is not in sealing engagement with the valve port 18. For example, the first aperture 28 may be cylindrical in shape (and circular in cross-sectional shape when viewed along the longitudinal axis 24) and may have a diameter slightly larger than a cylindrical first outer wall 183 of the valve disc 22.

Figure 4:
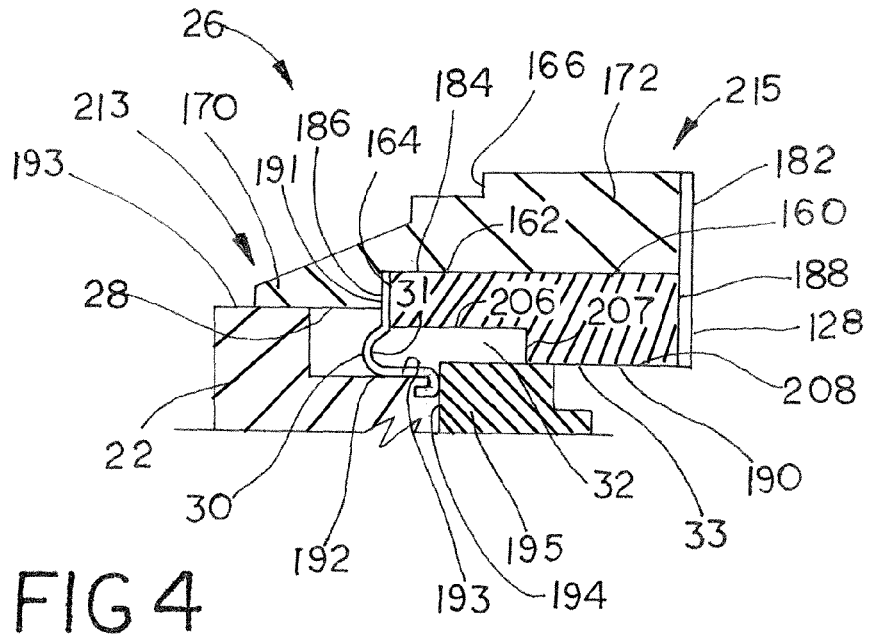
FIG. 4 is a partial side cross-sectional view of the housing assembly.

Still referring to FIG. 4, the balanced port housing 136 may have a longitudinal recess 160 that is defined by a cylindrical wall 162 and a vertically disposed end surface 164, and the end surface may be planar. The balanced port housing 136 may also have a shoulder 166 adapted to engage a corresponding shoulder 168 formed in the body 13 of the regulator valve 12 (as illustrated in FIG. 2). The balanced port housing 136 may also include a planar vertical wall 182 disposed adjacent to the second end 172, and the vertical wall 182 may be disposed in contact with or immediately adjacent to a surface of the retainer plate 128. The balanced port housing 136 may be symmetrical about a longitudinal axis that may be coaxially aligned with the longitudinal axis 24.

Referring to FIGS. 2 and 4, the housing assembly 26 may also include a diaphragm retainer 132 that may be disposed within the recess 160 of the balanced port housing 136 and may be held in place by a surface of the retainer plate 128. More specifically, the diaphragm retainer 132 may be annular and may include a cylindrical outer wall 184 that may be in contact with or adjacent to the cylindrical wall 162 of the recess 160, and a vertical, planar first end wall 186 may be adjacent to the end surface 164 of the recess 160. A vertical, planar second end wall 188 may be longitudinally offset from the first end wall 186, and the second end wall 188 may be disposed coplanar with the vertical wall 182 of the balanced port housing 136. In addition, the vertical wall 182 may be disposed in contact with or immediately adjacent to a surface of the retainer plate 128. An inner wall 190 may longitudinally extend from the first end wall 186 to the second end wall 188, and the inner wall 190 may comprise the interior surface 33 of the housing assembly 26. The inner wall 190 may be me comprised of a first cylindrical portion 206, a shoulder portion 207, and a second cylindrical portion 208, where a diameter of the first cylindrical portion 206 is greater than a diameter of the second cylindrical portion 208. The diaphragm retainer 132 may be symmetrical about a central axis that may be coaxially aligned with the longitudinal axis 24. Instead of the separate component described, the diaphragm retainer 132 may be integrally formed (in whole or in part) with the balanced port housing 136.

As illustrated in FIGS. 2 and 4, the fluid regulating device 10 may also include the balancing diaphragm 30, which may be disc-shaped and may be secured to a portion the housing assembly 26 and a portion of the valve disc 22. The balancing diaphragm 30 may be constructed of a flexible, substantially air-tight, material and a radially outward edge 191 of the balancing diaphragm 30 may be secured between the first end wall 186 of the diaphragm retainer 132 and the end surface 164 of the balanced port housing 136. A radially inward edge 192 that defines a central aperture of the balancing diaphragm 30 may be secured to any suitable portion of the valve disc 22 of the balancing port stem 116. For example, the radially inward edge 192 of the balancing diaphragm 30 may be sealingly secured between the valve disc 22 and the balanced port stem 116, or the radially inward edge 192 may be sealingly secured to the valve disc 22 adjacent to the balanced port stem 116. So secured, the balancing diaphragm 30 may cover or may be immediately adjacent to all or a portion of a cylindrical second outer wall 193 of the valve disc 22, and the cylindrical second outer wall 193 may have a diameter less than the diameter of the cylindrical first outer wall 183 of the valve disc 22. In addition, the balancing diaphragm 30 may cover or may be immediately adjacent to all or a portion of a top wall 194 of the valve disc 22. The balancing diaphragm 30 may be sized such that the valve disc 22 may translate from a fully open position to the closed position without interference from the balancing diaphragm 30.

Figure 6:
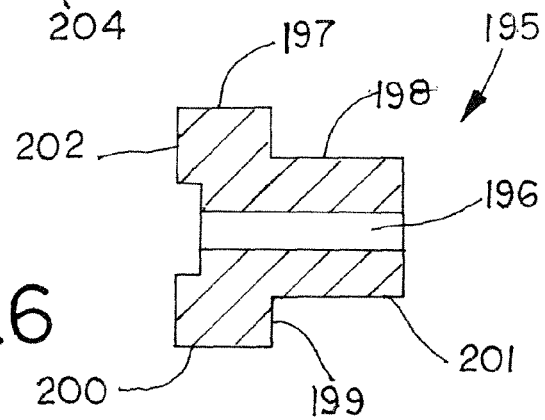
FIG. 6 is a side cross-sectional view of the guide insert.

As illustrated in FIGS. 2 and 6, the fluid regulating device 10 may also include a stationary guide insert 195 disposed between the valve disc 22 and the balancing spring seat 120. The guide insert 195 may have a central aperture 196 that extends along a central axis of the guide insert 195 from a first end 200 to a second end 201, and the central axis may be coaxially aligned with the longitudinal axis 24. The central aperture 196 may slidably receive the balancing port stem 116 such that the balancing port stem 116 displaces within the central aperture 196 relative to the guide insert 195. A seal may be disposed between the balancing port stem 116 and the central aperture 196 to prevent fluid from flowing between the gap between an outer surface of the balancing port stem 116 and the central aperture 196. The guide insert 195 may include a cylindrical first wall 197 extending from the first end 200 towards the second end 201 and a cylindrical second wall 198 extending from the second end 201 towards the first end 200. The first wall 197 may have a diameter greater than the second wall 198. A vertical seating wall 199 may extend between the first wall 197 and the second wall 198, and the seating wall 199 may be disposed between the first end 200 and the second end 201. The first wall 197 may have a diameter that is slightly smaller than the diameter of the inner wall 190 of the diaphragm retainer 132. A planar, vertical bottom surface 202 may be disposed at the first end 200 of the guide insert 195 adjacent to the valve disc 22. The guide insert 195 may be secured to the housing assembly 26 in any suitable manner. For example, a threaded portion of the first wall 197 may threadedly engage a threaded portion of the inner wall 190 of the diaphragm retainer 132. The guide insert 195 may be symmetrical about the longitudinal axis 24. Instead of the separate component described, the guide insert 195 may be integrally formed (in whole or in part) with the diaphragm retainer 132.

The seating wall 199 may be adapted to seat a first end of the balancing spring 148 and a second end of the balancing spring 148 may be adapted to engage a portion of the balancing spring seat 120, as illustrated in FIG. 2. The balancing spring 148 may be any suitable resilient member, such as a coil spring that is coaxially aligned with the longitudinal axis 24. Because the seating wall 199 is stationary, the second end of the balancing spring 148 biases the balancing spring seat 120 into engagement with the actuator stem 112. The balancing spring 148 may be pre-stressed to provide a suitable biasing force regardless of the position of the actuator stem 112.

Figure 5:
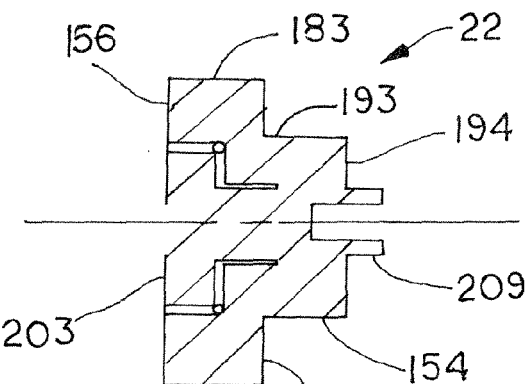
FIG. 5 is a partial side cross-sectional view of the valve disc.

Referring to FIGS. 2 and 5, the fluid regulating device 10 may include a valve disc 22. The valve disc 22 may extend along a central axis such that the valve disc has a first end 152 and a longitudinally opposite second end 154, and the central axis may be coaxially aligned with the longitudinal axis 24. The valve disc 22 may include the cylindrical first outer wall 183 extending from the first end 152 towards the second end 154 and the cylindrical second outer wall 193 extending from the second end 154 towards the first end 152. The first outer wall 183 may have a diameter greater than the second outer wall 193. A vertical transition wall 204 may extend between the first outer wall 183 and the second outer wall 193, and the transition wall 204 may be disposed between the first end 152 and the second end 154.

A planar, vertical top wall 205 may be disposed at the second end 154 of the valve disc 22, and the top wall 205 may be adjacent to or in contact with the bottom surface 202 of the guide insert 195 when the valve disc 22 is in the fully open position. The balancing portion stem 116 may be secured to the valve disc 22 at or adjacent to the second end 201 of the valve disc 22. For example, a portion of the balancing portion stem 116 may be received into and secured within an opening formed in a boss 209 that extends from the top wall 194, as illustrated in FIG. 2. The boss 209 may be adapted to be received into a corresponding aperture formed in the bottom surface 202 of the guide insert 195.

Referring to FIGS. 2 and 5, the valve disc 22 may include a sealing surface 156 disposed at the first end 152 of the valve disc 22. The sealing surface 26 may be disposed adjacent to the outer radial end of the valve disc 22, and the sealing surface adapted to sealingly engage the valve port 18 in the closed position. The sealing surface 156 may be a portion of a sealing insert secured within a cavity formed in the valve disc 22 or may be a surface on the valve disc 22 itself. The sealing surface 156 may include any suitable material or combination of materials, such as a resilient, compressible material. An intermediate surface 203 may be disposed radially inward of the sealing surface 156 (i.e., in a radial direction towards the longitudinal axis 24) at the first end 152 of the valve disc 22.

As illustrated in FIGS. 2 and 4, the balancing cavity 32 may be at least partially defined by a portion of the top surface 31 of the balancing diaphragm 30 and at least a portion of the interior surface 33 of the housing assembly 26. More specifically, the balancing cavity 32 may be defined by all or a portion of the top surface 31 of the balancing diaphragm 30, all or a portion of the inner wall 190 of the diaphragm retainer 132, all or a portion of the bottom surface 202 of the guide insert 195, and/or all or a portion of the first wall 197 of the guide insert 195. When the valve disc 22 is in the fully open position illustrated in FIG. 2, the balancing cavity 32 may be at least partially defined by all or a portion of the top surface 31 of the balancing diaphragm 30, and all or a portion of the first wall 197 of the guide insert 195.

As illustrated in FIG. 2, the fluid regulating device 10 may include the sensing passage 34 extending from the inlet 14 of the regulator valve 12 to the balancing cavity 32 such that the inlet 14 of the regulator valve 12 is in fluid communication with the balancing cavity 32. The sensing passage 34 may be a defined, for example, by an interior of a tube 210. The tube 210 may be rigid or may deformable, and the tube 210 may have any suitable thickness and cross-sectional shape. The tube 210 may be formed as a single, unitary part or may be formed or several parts coupled to form the tube 210. In addition, or alternatively, all or part of the sensing passage 34 may be defined by an aperture formed through a portion of the valve body 13, for example. A single sensing passage 34 may be incorporated into the fluid regulating device 10, or more than one sensing passages 34 may be used.

Still referring to FIG. 2, the sensing passage 34 (or the tube 210 or similar structure defining the sensing passage 34) may have a first end 300 disposed at or adjacent to the inlet 14 upstream of the valve port 18 (and upstream of the throat 38 formed within the valve body 13) and a second end 302 disposed adjacent to the balancing cavity 32. The tube 210 may extend through an interior portion of the valve body 13 partially defining the inlet 14 (such as an interior wall 211 of the valve body 13 separating the inlet 14 from the outlet 16) and through a portion of the housing assembly 26—and more specifically a portion of the housing assembly 26 between a first end 213 of the housing assembly and a second end 215 of the housing assembly 26. The sensing passage 34 may further extend through a portion of the outlet 16 disposed between the interior wall 211 and the housing assembly 26.

As illustrated in FIG. 2, the sensing passage 34 may be linear, and a centerline of the sensing passage 34 may extend in a direction that is not parallel to the longitudinal axis 24. More specifically, the centerline L of the sensing passage 34 may form an oblique angle with the longitudinal axis 24 when viewed in a cross-sectional plane taken along the longitudinal axis 24, as illustrated in FIG. 2. For example, the angle between the centerline L of the sensing passage 34 and the longitudinal axis 24 may be between 10 degrees and 80 degrees. Alternatively, the centerline L of the sensing passage 34 may be disposed at a right angle to the longitudinal axis 24.

So configured, the sensing passage 34 may extend through the balancing port housing 136 between the first end 170 and the second end 172, as illustrated in FIGS. 2 and 4. For example, the sensing passage 34 may extend through a portion of the longitudinal recess 160 of the balancing port housing 136, that the portion of the longitudinal recess 160 may be at or adjacent to the end surface 164 of the longitudinal recess 160. The sensing passage 34 may also extend through a portion of the diaphragm retainer 132, such as a portion at or adjacent to the first end wall 186.

Instead of a linear sensing passage 34, the sensing passage 34 may have any suitable shape or combination of shapes. For example, a first segment of the sensing passage 34 may be linear and a second segment of the sensing passage 34 may be non-linear, and the first segment of the sensing passage 34 may a centerline that is not parallel to the longitudinal axis 24. Alternatively, a first segment of the sensing passage 34 may be linear and a second segment of the sensing passage 34 may be linear, with a centerline of the first segment forming an obtuse angle with a centerline of the second segment. In another alternative embodiment, at least a portion of the sensing passage 34 may be non-linear, and the portion of the sensing passage that is non-linear may have a centerline that has a radius of curvature when viewed in a cross-sectional plane taken along the longitudinal axis 24.

In an alternative embodiment illustrated in FIG. 3, the sensing passage 34 (including the tube 210) may at least partially extend external to the valve body 13 of the regulator valve 12 (i.e., outside of an interior volume defined by the valve body 13). More specifically, a first portion 304 of the sensing passage 34 (such as a first portion of the tube 210) may extend through a portion of the valve body 13 (or an element secured to the valve body 13) defining the inlet 14 or a portion secured to the inlet 14 such that the first portion 304 of the sensing passage 34 is in fluid communication with the inlet 14. A first end 308 of the first portion 304 may correspond to the first end 300 of the sensing passage 34, and the first end 308 may extend within the inlet 14 or be disposed adjacent to a surface of the valve body 13 defining the inlet 14. A second end 310 of the first portion 304 may be disposed external to the valve body 13.

Still referring to FIG. 3, a second portion 306 of the sensing passage 34 may extend from the second end of the first portion 304 such that the second portion 306 is at least partially disposed external to the valve body 13. More specifically, a first end 312 of the second portion 306 may be disposed adjacent to the second end 310 of the first portion 304, and the first end 312 of the second portion 306 may be disposed external to the valve body 13. A second end 314 of the second portion 306 may be disposed within or adjacent to the balancing cavity 32 such that the inlet 14 of the regulator valve 12 is in fluid communication with the balancing cavity 32. The second portion 306 adjacent to the second end 314 may extend through a portion of the valve body 13, such as a portion of the valve mouth 40. The second portion 306 may further extend through a portion of the housing assembly 26, such as a portion of the housing assembly 26 between a first end 213 of the housing assembly and a second end 215 of the housing assembly 26. More specifically, the second portion 306 may extend through the balancing port housing 136 between the first end 170 and the second end 172. For example, the second portion 306 may extend through a portion of the longitudinal recess 160 of the balancing port housing 136, such as a portion of the cylindrical wall 162 of the longitudinal recess 160. The second portion 306 may also extend through a portion of the diaphragm retainer 132, such as a portion of the inner wall 190.

The first portion 304 and the second portion 306 may not be coaxially aligned, and an angle between the first portion 304 and the second portion 306 (or a segment of the second portion 306 adjacent to the first end 312) may form an obtuse angle. The first portion 304 and the second portion 306 may have any suitable shape or combination of shapes. For example, the first portion 304 and the second portion 306 may each be linear or partially linear. Each of the first portion 304 and the second portion 306 may have two or more linear segments, and these linear segments may not be coaxially-aligned. Also, each of the first portion 304 and the second portion 306 may have one or more non-linear segments, such as one or more curved segments.

As illustrated in FIG. 1, the fluid regulating device 10 may optionally include a secondary device in the form of an overpressure monitor 212 that operates to cut off the fluid flow through the regulator valve 12 in an overpressure situation until the downstream pressure is reduced after a failure of the actuator 20. The monitor 212 in the illustrated embodiment has a similar configuration as the actuator 20, and the monitor 212 also operates in a similar manner as the actuator 20. Because the monitor 212 only responds in the event that the downstream pressure exceeds a cutoff pressure established by a diaphragm 248 and a control spring 252, a monitor diaphragm subassembly 242 and a disc and balancing subassembly 244 are configured accordingly. A balancing spring 214 disposed between a spring seat 286 and a diaphragm retainer 292 biases a valve disc 222 to the normal open position. A coupler 272 and a control arm 276 are configured so that the coupler 272 only drives the control arm 276 in the direction to move the valve disc 222 toward the closed position and into engagement with the upstream side of the valve port 18 to cut off the fluid flow through the regulator valve 12. A pin 272a of the coupler 272 engages the free end 276b of the control arm 276 to rotate the control arm 276 when the diaphragm 248 and a piston 250 move upward due to a downstream pressure exceeding the cutoff pressure. Conversely, a top portion 272a of the coupler 272 is disposed remotely from the control arm 276 so the downward movement of the diaphragm 248 and piston 250 caused by decreases in the downstream pressure do not cause movement of the control arm 276. Of course, alternate configurations of overpressure monitors are know to those skilled in the art, including monitors configured to close when the downstream pressure drops below a low pressure cutoff, and are contemplated by the inventors as having use in gas regulators in accordance with the present disclosure.

When an operating demand is placed on the gas distribution system, e.g., a user begins operating an appliance such as a furnace, a stove, etc., the appliance draws gas from the outlet 16 and correspondingly the control cavity 44 of the actuator 20 and the control cavity 232 of the monitor 212, thereby reducing the pressure that is sensed by the diaphragms 58, 248. As the pressure sensed by the diaphragm 58 decreases, a force imbalance occurs between a control spring force and an outlet pressure force on the diaphragm 58 such that the control spring 62 expands and displaces the diaphragm 58 and piston 60 downward relative to the housing 42. This causes the control arm 108 to pivot in the clockwise direction, which in turn rotates the finger 113 relative to the surface of the actuator stem 112. This allows the actuator stem 112 and the valve disc 22 to move away from the outlet 125 of the valve port 18 due to the force of the balancing spring 148 to open the regulator valve 12. At the same time, the pressure decrease may also cause a force imbalance to occur between a control spring force and an outlet pressure force on the diaphragm 248 such that the control spring 252 expands and displaces the diaphragm 248 and piston 250 downward relative to the housing 230. However, because the upper portion of the coupler 272 is disposed remotely from the control arm 276, the monitor 212 does not similarly respond to the drop in pressure with movement of the valve disc 222.

When the demand is removed from the gas distribution system, such as when the user shuts off the appliance, the regulator 10 initially responds by decreasing the fluid flow through the regulator valve 12. As gas continues to flow through the valve port 18 and to the downstream portion of the system, the pressure increases at the outlet 16 and, correspondingly, in the control cavity 44 of the actuator 20 and the control cavity 232 of the monitor 212. As the pressure sensed by the diaphragm 58 increases and overcomes the control spring force, the diaphragm 58 and piston 60 are forced upward relative to the housing 42. The upward movement causes the control arm 108 to pivot in the counterclockwise direction, which in turn drives the actuator stem 112 and the valve disc 22 toward the valve port 18 to reduce the fluid flow through the regulator valve 12. Under normal operating conditions, the outlet pressure will drop to approximately the actuator setpoint pressure and remain there until the downstream demand changes in a manner that causes a response from by the actuator 20.

The monitor cutoff pressure is greater than the actuator setpoint pressure, and the monitor 212 does not typically respond to pressure variations within the normal operating range of the fluid regulating device 10. In the event of a failure of the actuator 20 such as, for example, the rupturing of the diaphragm 58, the valve disc 22 may remain open despite increases in the downstream pressure beyond the actuator setpoint pressure. Eventually, the pressure at the sensing point of the Pitot tube 216 reaches the cutoff pressure of the monitor 212. The downstream pressure communicated to the control cavity 232 by the monitor branch 218 causes a force imbalance to occur between the control spring force and the outlet pressure force on the diaphragm 248 such that the control spring 252 contracts and displaces the diaphragm 248 and piston 250 upward relative to the housing 230. When the piston 250 moves, the pin 272a of the coupler 272 rotates the control arm 276 to drive the actuator 278 and move the valve disc 222 into engagement with the valve port 18 to shut off the fluid flow through the regulator valve 12. The monitor 212 will continue to stop the fluid flow as long as the pressure at the sensing point of the Pitot tube 216 remains above the monitor cutoff pressure.

In operation, when the valve disc 22 is in the open position (i.e., when the sealing surface 156 of the valve disc 22 does not sealingly engage the valve port 18), fluid flows from the inlet 14 to the outlet 16 through the valve port 18. In this open position, a portion of the fluid flowing from the inlet 14 to the outlet 16 enters the first end 300 of the sensing passage 34 and flows through the sensing passage 34 and into the balancing cavity 32 and into contact with the top surface 31 of the balancing diaphragm 30. As such, the sensing passage 34 is configured to place the surface of the top surface 31 of the balancing diaphragm 30 in fluid communication with the upstream pressure bearing on the valve disc 22. Accordingly, the balancing diaphragm 30 provides a force on the valve disc 22 in the direction of the valve port 18 to compensate for the force applied to the valve disc 22 due to the upstream pressure of the fluid passing through the valve port 18. The components of the disc and balancing subassembly 54 are configured so that the force applied by the balancing diaphragm 30 is approximately opposite and equal to the force of the upstream pressure on the valve disc 22 to eliminate any influence of the upstream pressure on the diaphragm subassembly 52 and thereby allowing for more accurate control of the downstream pressure by the fluid regulating device 10. Moreover, the upstream pressure introduced into to the balancing cavity 32 provides for a relatively high inlet pressure rating. That is, by sensing a constant upstream pressure, the stability of the fluid regulating device 10 is improved. Such a configuration allows for high flow capacity at high inlet pressures because the sensing pressure is constant as the valve opens.

While certain representative embodiments and details have been shown for purposes of illustrating the invention, it will be apparent to those skilled in the art that various changes in the methods and apparatus disclosed herein may be made without departing from the scope of the invention.

What is claimed:

1. A fluid regulating device, comprising: a regulator valve having a valve body defining an inlet and an outlet, the regulator valve further including a valve port disposed between the inlet and the outlet; an actuator coupled to the regulator valve and comprising a valve disc, the valve disc disposed within the regulator valve and adapted for displacement along a longitudinal axis between a closed position sealingly engaging the valve port and an open position disposed away from the valve port; a housing assembly disposed within the valve body, the housing assembly having a first aperture adapted to receive a portion of the valve disc; a balancing diaphragm secured to a portion of the valve disc and a portion of the housing assembly, wherein a longitudinal distance between the portion of the valve disc and the portion of the housing assembly; a balancing cavity, wherein a portion of the balancing cavity is defined by a portion of a top surface of the balancing diaphragm and at least a portion of the interior surface of the housing assembly; and a sensing passage extending from the inlet of the regulator valve to the balancing cavity such that the inlet of the regulator valve is in fluid communication with the balancing cavity, wherein the balancing diaphragm extends across the balancing cavity from a first point of the housing assembly to a second point of the valve disc in a direction normal to the longitudinal axis, and wherein a first distance between the first point of the housing assembly and the second point of the valve disc that is along the longitudinal axis is less that a second distance between the first point of the housing assembly and the second point of the valve disc that is normal to the longitudinal axis, wherein the sensing passage extends through the housing assembly between a first end of the housing assembly and a second end of the housing assembly, and wherein a centerline of the sensing passage is not parallel to the longitudinal axis, and wherein the sensing passage has a first end disposed upstream of the valve port and a second end disposed adjacent to the balancing cavity, wherein the sensing passage is stationary relative to the valve body when the valve disc displaces between the open position and the closed position.

2. The fluid regulating device of claim 1, wherein an angle between the centerline of the sensing passage and the longitudinal axis is between 10 degrees and 80 degrees.

3. The fluid regulating device of claim 1, wherein the housing assembly includes a balanced port housing and a diaphragm retainer disposed within a recess of the balanced port housing.

4. The fluid regulating device of claim 3, wherein a radially inward edge of the balancing diaphragm is secured to the portion of the valve disc and a radially outward edge of the balancing diaphragm is secured between a portion of the diaphragm retainer and a portion of the balanced port housing.

5. The fluid regulating device of claim 4, wherein the interior surface of the housing assembly is an inner surface of the diaphragm retainer.

6. The fluid regulating device of claim 1, wherein the sensing passage is linear.

7. The fluid regulating device of claim 1, wherein at least a portion of the sensing passage is linear, and wherein the portion of the sensing passage that is linear has a centerline that is not parallel to the longitudinal axis.

8. The fluid regulating device of claim 1, wherein at least a portion of the sensing passage is non-linear, and wherein the portion of the sensing passage that is non-linear has a centerline that has a radius of curvature.

9. The fluid regulating device of claim 1, wherein the sensing passage at least partially extends external to the valve body of the regulator valve.

10. The fluid regulating device of claim 9, wherein a first portion of the sensing passage extends through a portion of the inlet such that the first portion of the sensing passage is in fluid communication with the inlet, and wherein a second end of the first portion is disposed external to the valve body.

11. The fluid regulating device of claim 9, wherein a first end of a second portion of the sensing passage is disposed adjacent to the second end of the first portion, the first end of the second portion being disposed external to the valve body, and wherein a second end of the second portion is disposed within or adjacent to the balancing cavity such that the inlet is in fluid communication with the balancing cavity.

12. The fluid regulating device of claim 1, wherein the balancing diaphragm is secured to the portion of the valve disc and the portion of the housing assembly, and the portion of the housing assembly is disposed between the first end and the second end of the housing assembly.

13. The fluid regulating device of claim 1, wherein the balancing diaphragm is annular in shape.

14. The fluid regulating device of claim 1, wherein the balancing diaphragm is not a bellows.

* * * * *